US007370094B2

(12) United States Patent
Rousseau et al.

(10) Patent No.: US 7,370,094 B2
(45) Date of Patent: May 6, 2008

(54) METHOD AND DEVICE FOR ADJUSTING THE MAXIMUM SIZE OF THE INFORMATION SEQUENCES TRANSMITTED IN A TELECOMMUNICATION NETWORK

(75) Inventors: Pascal Rousseau, Rennes (FR); Patrice Nezou, Bruz (FR)

(73) Assignee: Canon Kabushiki Kaisha, Tokyo (JP)

( * ) Notice: Subject to any disclaimer, the term of this patent is extended or adjusted under 35 U.S.C. 154(b) by 836 days.

(21) Appl. No.: 10/413,381

(22) Filed: Apr. 15, 2003

(65) Prior Publication Data

US 2003/0208615 A1 Nov. 6, 2003

(30) Foreign Application Priority Data

May 2, 2002 (FR) ................................. 02 05506

(51) Int. Cl.
*G06F 15/177* (2006.01)
*G06F 15/16* (2006.01)
*H04M 7/00* (2006.01)

(52) U.S. Cl. ...................... 709/220; 719/311; 370/901; 379/220.01; 379/327; 710/30; 709/236

(58) Field of Classification Search ............... 709/220, 709/200–203, 217–219, 221–229, 236, 230–232, 709/238, 249, 245, 246; 719/311; 370/901; 379/220.01, 327; 710/30
See application file for complete search history.

(56) References Cited

U.S. PATENT DOCUMENTS

| 5,425,023 A | 6/1995 | Haraguchi et al. ............ 370/60 |
| 5,809,254 A | 9/1998 | Matsuzono ............ 395/200.65 |
| 5,931,961 A | 8/1999 | Ranganathan et al. ...... 714/712 |
| 5,959,974 A | 9/1999 | Badt et al. ................... 370/233 |
| 2002/0184573 A1 | 12/2002 | Rousseau et al. ............. 714/43 |
| 2003/0081628 A1* | 5/2003 | Sugar et al. ................ 370/461 |
| 2003/0133427 A1* | 7/2003 | Cimini et al. ............... 370/338 |
| 2003/0137993 A1* | 7/2003 | Odman ....................... 370/468 |

OTHER PUBLICATIONS

J. Mogul et al., "Path MTU Discovery", IETF Request for Comments: 1191, Nov. 1990, pp. 10-12.
A. Kamerman, et al., "Net Throughput with IEEE 802.11 Wireless LANs", Proceedings of IEEE Conference on Wireless Communications and Networking, Chicago, IL, Sep. 23-28, 2000, pp. 747-752.

* cited by examiner

Primary Examiner—Haresh Patel
(74) Attorney, Agent, or Firm—Fitzpatrick, Cella, Harper & Scinto (57) ABSTRACT

In order to adjust the maximum size of the information sequences transmitted by a plurality of terminals in a network, according to a predetermined network protocol, between two subnetworks supporting different maximum sizes of information sequence: there is stored in an information base, for each of the terminals, an identifier for this terminal and the maximum size of the information sequences allowed by the network protocol for communicating with this terminal; the information base is updated from the analysis of any information sequence conveyed in one of the subnetworks; then, for each information sequence to be transmitted: the identifier of the destination terminal and the corresponding maximum size of the information sequences are read in the information base; the maximum size read is compared with the current maximum size allowed by the network protocol; and, if the maximum size read is less than the current maximum size, the current maximum size is adjusted by allocating to it the value of the maximum size read.

21 Claims, 6 Drawing Sheets

METHOD AND DEVICE FOR ADJUSTING THE MAXIMUM SIZE OF THE INFORMATION SEQUENCES TRANSMITTED IN A TELECOMMUNICATION NETWORK

CROSS REFERENCE TO RELATED APPLICATIONS

This application claims the right of priority under 35 US.C. § 119 based on French patent application No. FR 02 05506 filed May 2, 2002, which is hereby incorporated by reference herein in its entirety as if fully set forth herein.

BACKGROUND OF THE INVENTION

The present invention relates to a method and device for adjusting the maximum size of the information sequences transmitted in a telecommunications network.

In order to connect a local area subnetwork in accordance with a first standard, such as IEEE 802.11, with a local area subnetwork according to a second standard different from the first, such as IEEE 802.3, a bridge is used, such as an access point, which examines the content of each frame in order to decide whether or not to transfer it to the adjacent subnetwork.

This type of service is described by IEEE 802.1d, which recommends that the maximum length or size of the data information supported by a bridge between two networks should be the smallest of the maximum sizes of the data information supported by each of these two networks.

In the above non-limiting example, this length is thus limited to the maximum value allowed by the IEEE 802.3 network, namely 1500 data information bytes.

If it is considered that all the items of equipment located on the local area radio network of the IEEE 802.11 type are liable to communicate with an item of equipment on the local area network of the IEEE 802.3 type, each of them will be configured with a maximum size of the data information fixed at 1500 bytes.

However, this static configuration is prejudicial to the overall performance of this radio communication network. Thus a reduction of around 15% of the theoretical overall maximum performance appears for a local area radio network of the IEEE 802.11a type and around 12% for a local area radio network of the IEEE 802.11b type.

The purpose of the present invention is to remedy the drawbacks mentioned above.

SUMMARY OF THE INVENTION

For this purpose, the present invention provides a method of adjusting the maximum size of the information sequences transmitted by a plurality of terminals in a telecommunications network, according to a predetermined network protocol, between two subnetworks supporting different maximum sizes of information sequences, notable in that it comprises steps according to which:

there is stored in an information base, for each of the terminals, an identifier for this terminal and the maximum size of the information sequences allowed by the network protocol for communicating with this terminal;

the information base is updated from the analysis of any information sequence conveyed in one of the subnetworks, whatever the destination address of the information sequence;

then, for each information sequence to be transmitted:

the identifier of the destination terminal and the maximum size of the corresponding information sequences are read in the information base;

the maximum size read is compared with the current maximum size allowed by the network protocol; and if the maximum size read is less than the current maximum size, the current maximum size is adjusted by allocating to it the value of the maximum size read.

Thus, by using a dynamic adaptation of the maximum size of the information to be transmitted as a function of the destination of this information, the invention makes it possible to optimize the communications on the network.

According to a particular feature, during the updating step, the information base is updated from control information and from addressing information accompanying the information sequence.

This makes it possible to avoid putting in place a specific protocol, which would require collaboration between the various terminals and would reduce the useful bandwidth.

According to a particular feature, during the updating step, there is associated with each of the terminals an item of date information corresponding to the date of the last update of the information base for this terminal, and the adjustment method also comprises a purging step, carried out periodically, consisting of eliminating from the information base the information considered to be obsolete, as a function of this date information. On the one hand this makes it possible to limit the quantity of information stored in the information database and on the other hand to guarantee the pertinence of the information base in a terminal mobility context.

In one variant embodiment, there is kept in the information base only the information relating to the terminals which have a maximum size of the information sequences less than that of the destination terminal. This variant makes it possible to limit the quantity of information stored in the information base.

According to another variant, the updating step is performed solely following the reception of an information sequence intended for the destination terminal. The advantage of this variant is to reduce the number of processing steps to be carried out and thus to reduce the energy consumption. It also allows a simplified implementation, for example in the case of an implementation in software form.

According to a particular characteristic, the information base is situated in the communication interface of a terminal allowing communication between the two subnetworks. This allows updating of the information base in real time.

One of the two subnetworks can for example be in accordance with the IEEE 802.11 standard, the other subnetwork can for example be in accordance with the IEEE 802.3 standard and the information sequence can be contained in a MAC frame.

For the same purpose as that indicated above, the invention also relates to the use of an adjustment method as succinctly described above, for initiating a discovery procedure consisting of sending test messages in the network in order to discover a maximum size of the information sequences less than the size adjusted by the adjustment method according to the invention.

Still for the same purpose, the invention also provides a device for adjusting the maximum size of the information sequences transmitted by a plurality of terminals in a telecommunications network, according to a predetermined network protocol, between two subnetworks supporting different maximum sizes of information sequences, notable in that it comprises:

a module for storing in an information base, for each of the terminals, an identifier for this terminal and the maximum size of the information sequences allowed by the network protocol for communicating with this terminal;

a module for updating the information base from the analysis of any information sequence conveyed in one of the subnetworks, whatever the destination address of the information sequence;

a module for reading in the information base, for each information sequence to be transmitted, the identifier of the destination terminal and the corresponding maximum size of the information sequences;

a module for comparing, for each information sequence to be transmitted, the maximum size read with the current maximum size allowed by the network protocol; and a module for adjusting the current maximum size by allocating to it the value of the maximum size read, if the maximum size read is less than the current maximum size.

The present invention also relates to a telecommunications network comprising means adapted to implement an adjustment method as above.

The present invention also relates to a telecommunications network comprising an adjustment device as above.

The present invention also relates to a mobile station in a telecommunication network, comprising means adapted to implement an adjustment method as above.

The present invention also relates to a mobile station in a telecommunications network, comprising an adjustment device as above.

The present invention also relates to a base station in a telecommunications network, comprising means adapted to implement an adjustment method as above.

The present invention also relates to a base station in a telecommunications network comprising an adjustment device as above.

The invention also relates to:

an information storage means which can be read by a computer or microprocessor storing instructions of a computer program, for implementing an adjustment method as above, and a partially or totally removable information storage means which can be read by a computer or microprocessor storing instructions of a computer program, for implementing an adjustment method as above.

The invention also relates to a computer program product comprising sequences of instructions for implementing an adjustment method as above.

The particular features and the advantages of the adjustment device, of the various telecommunications networks, of the various mobile stations, of the various base stations, of the various storage means, of the computer program product and of the use of the adjustment method being similar to those of the adjustment method according to the invention, they are not repeated here.

BRIEF DESCRIPTION OF THE DRAWINGS

Other aspects and advantages of the invention will emerge from a reading of the following detailed description of particular embodiments, given by way of non-limiting examples. The description refers to the drawings which accompany it, in which.

DETAILED DESCRIPTION OF THE INVENTION

Figure 1:
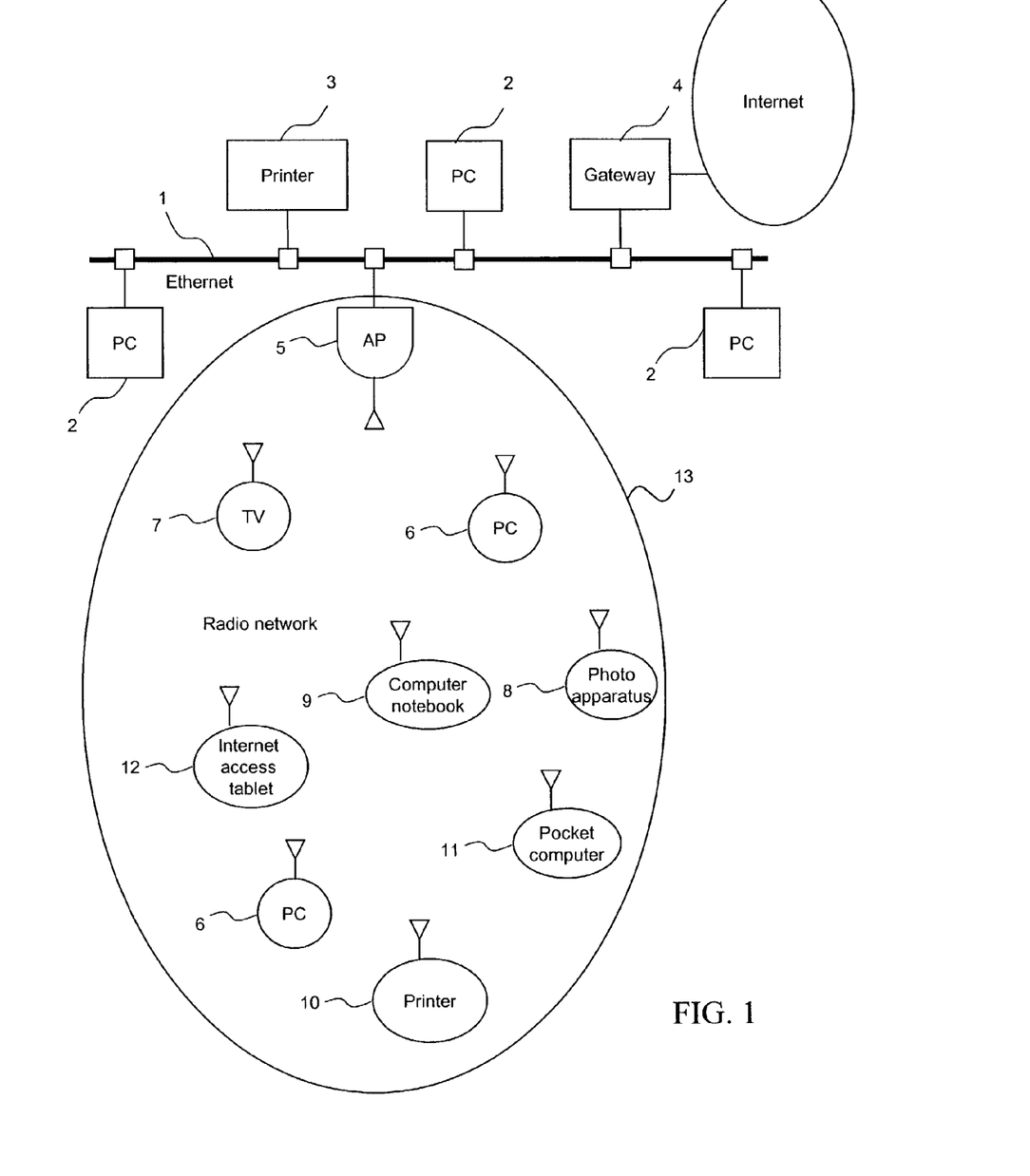
FIG. 1 illustrates schematically a communication network composed of a local area subnetwork of the Ethernet type in accordance with the IEEE 802.3 standard and a radio local area subnetwork in accordance with the IEEE 802.11 standard.

FIG. 1 depicts schematically an example of a communication network in which the invention can be implemented. The network depicted is composed of a local area subnetwork 1 of the Ethernet or IEEE 802.3 type and a radio local area subnetwork 13 of the IEEE 802.11 type.

In this example, on the one hand, there are connected to the Ethernet network, personal computers or PCs 2, a printer 3, an Internet gateway 4 and an access point 5 to the IEEE 802.11 network.

On the other hand, there are connected to the IEEE 802.11 network PCs 6, a television 7, a photographic apparatus 8, a computer notebook 9, a printer 10, a pocket computer 11 and an Internet access tablet 12.

These items of equipment can communicate with each other, either within the same subnetwork, or between two subnetworks through the access point 5.

Figure 2:
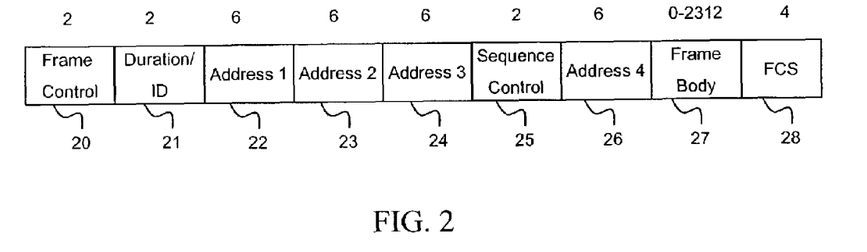
FIG. 2 illustrates schematically the format of the MAC frames in accordance with the IEEE 802.11 standard.

FIG. 2 illustrates the format of an IEEE 802.11 frame. The figures above the various fields indicate the size of these fields, in numbers of bytes.

The field "Frame Control" 20 allows the interpretation of the fields contained in the header of an IEEE 802.11 frame.

The fields 22, 23, 24 and 26, that is to say successively "Address 1", "Address 2", "Address 3" and "Address 4", can represent several types of identifier. In addition to the identification of the source and destination MAC addresses, they can represent the identifier of the radio cell and the identifier of the terminal transmitting and the terminal receiving the IEEE 802.11 frame.

The type of identifier contained in each of these fields is specified by the field "Frame Control" 20.

The field "Frame Body" 27 contains the data information, which can have a variable size of between 0 and 2312 bytes.

A detailed description of these fields and of the fields "Duration/ID" 21, "Sequence Control" 25 and "FCS" 28 is given by the standard ANSI/IEEE 802.11, "Wireless LAN MAC and PHY specification".

Figure 3:
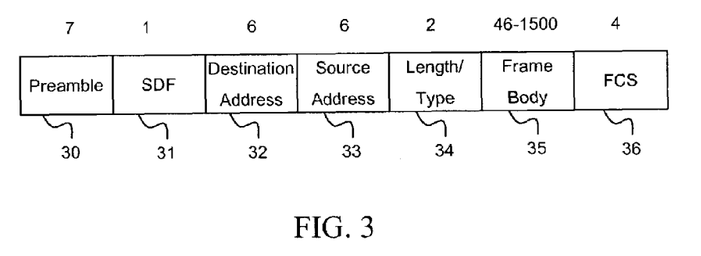
FIG. 3 illustrates schematically the format of the MAC frames in accordance with the IEEE 802.3 standard.

The standard ANSI/IEEE 802.3, "CSMA/CD access method and Physical Layer Specifications", specifies the fields "Preamble" 30, "SDF" 31, "Destination Address" 32, "Source Address" 33, "Length/Type" 34, "Frame Body" 35 and "FCS" 36 of the MAC frame in accordance with the IEEE 802.3 standard illustrated in FIG. 3.

It should be noted that the field 35 is composed of the data information, which can have a variable size of between 0 and 1500 bytes, and padding information, which can have a variable size of between 0 and 46 bytes.

In addition, the size of an IEEE 802.3 frame is between 64 and 1536 bytes.

Figure 4:
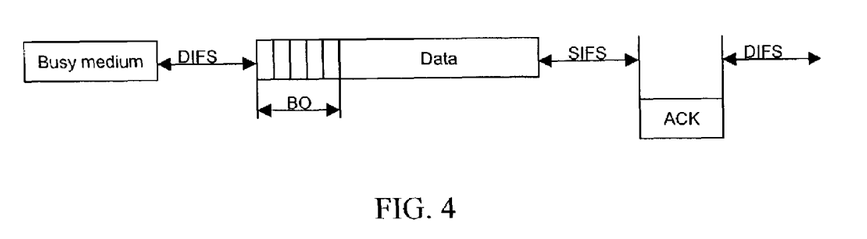
FIG. 4 illustrates schematically the method of access to the base channel in the IEEE 802.11 protocol for a distributed functioning mode with no RTS/CTS mechanism.

FIG. 4 illustrates the method of access to the base channel in the IEEE802.11 protocol for a so-called distributed functioning mode with no RTS/CTS mechanism, known to persons skilled in the art.

In this functioning mode, there exist two time intervals: DIFS ("Distributed InterFrame Space") and SIFS ("Short InterFrame Space").

When a transmission request is posted, the channel is sounded for a DIFS period. At the expiry of this period, if the channel is free, the frame corresponding to the request for transmission can be transmitted.

In the contrary case, the transmission process is stopped and then a "backoff" process (BO in the drawing) is implemented in order to perform the transmission when the channel is released, after expiry of the backoff.

Following this transmission, the destination of this frame, after elapse of a period SIFS, sends an acknowledgement packet ACK. The transmission is a success when the sender of the request receives this acknowledgement. In the contrary case, it is considered that a collision has arisen and the backoff process is repeated in order to make a new attempt at transmission.

As indicated in FIG. 2, the quantity of data information transmitted in an IEEE 802.11 frame is variable and can be between 0 and 2312 bytes. However, the SIFS and DIFS intervals and the radio header contained in an IEEE 802.11 frame used by the MAC protocol are independent of this size.

Because of this, the overall performance of this transmission system in terms of rate is all the higher, the greater the quantity of data information transmitted in the frames, and hence the advantage of adjusting the maximum size of the information sequences transmitted.

Figure 5:
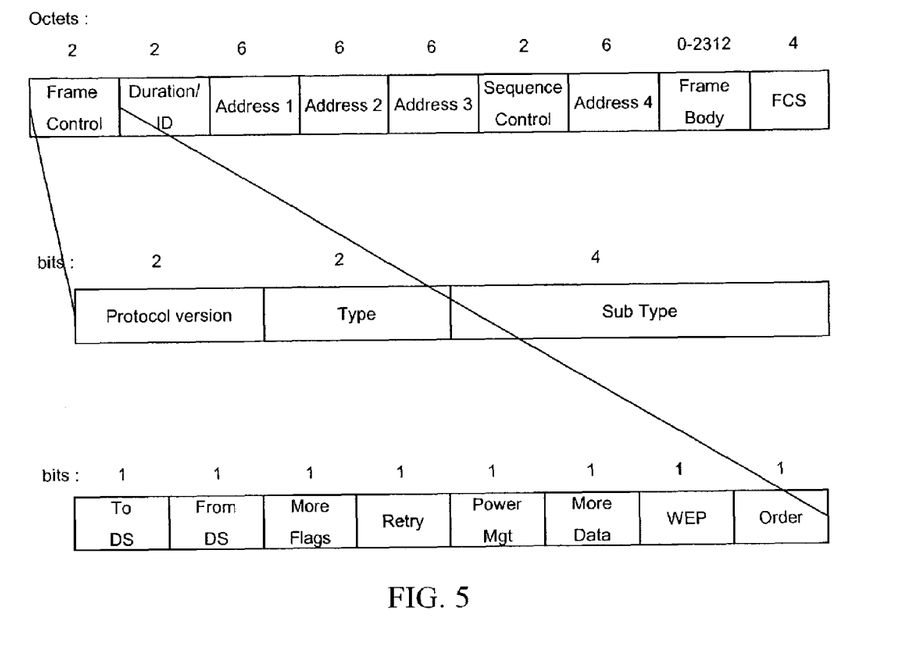
FIG. 5 illustrates schematically the definition of the check bits contained in the "Frame control" field of the frames in accordance with the IEEE 802.11 standard.

FIG. 5 illustrates the format of the "Frame Control" field contained in the header of an IEEE 802.11 frame.

A detailed description of this field is given by ANSI/IEEE 802.11, "Wireless LAN MAC and PHY specification". The presence of two control information bits "ToDS" and "FromDS", will be noted, which, in conjunction with the four address fields of the header of the IEEE802.11 frame mentioned above, make it possible to identify the source and the destination of this frame.

Figure 6:
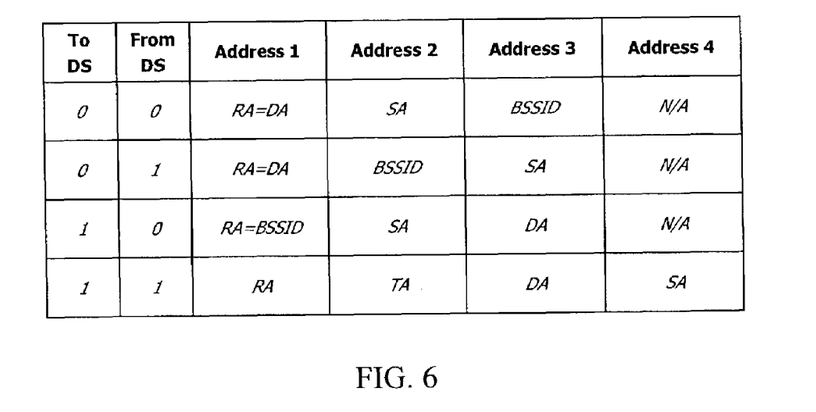
FIG. 6 illustrates the meaning of the address fields of the frames in accordance with the IEEE 802.11 standard.

The table in FIG. 6 specifies the use of the parameters contained in the address fields "Address 1", "Address 2", "Address 3" and "Address 4" of an IEEE 802.11 frame. The usage of these fields is determined by the value of the control information bits "ToDS" and "FromDS".

Whatever the values of the bits "ToDS" and "FromDS", the parameter "Address 1" contains the identifier DA or BSSID of the terminal which will receive the radio frame, this equipment item being able to be the final destination of this or simply a gateway affording access thereto.

Where the bit "FromDS" is 0, the parameter "Address 2" contains the identifier SA of the source terminal. In the contrary case, if the bit "ToDS" is 0, the parameter "Address 2" contains the identifier BSSID of the access point, and if the bit "ToDS" is 1, the parameter "Address 2" contains the identifier TA of the access point at the origin of the radio transmission, without being the source equipment item from which the information to be transmitted came.

When the bits "FromDS" and "ToDS" are 0, the parameter "Address 3" contains the identifier BSSID of the access point. When "ToDS" is equal to 0 and "FromDS" is equal to 1, the parameter "Address 3" contains the identifier SA of the source equipment from which the information to be transmitted came. Finally, when "ToDS" is 1, the parameter "Address 3" contains the identifier DA of the destination of the frame to which the information contained therein is addressed.

The parameter "Address 4" has meaning only where "ToDS" and "FromDS" are 1, namely for the interconnection of two local area networks through a radio link of the IEEE 802.11 type. In this case, the parameter "Address 4" contains the identifier SA of the source equipment item from which the information to be transmitted came.

A detailed description of these fields is given by ANSI/IEEE 802.11, "Wireless LAN MAC and PHY specification".

Thus an analysis of the IEEE 802.11 frames makes it possible to locate an item of equipment, either on the IEEE 802.11 radio local area subnetwork, or on the Ethernet local area network.

Figure 7:
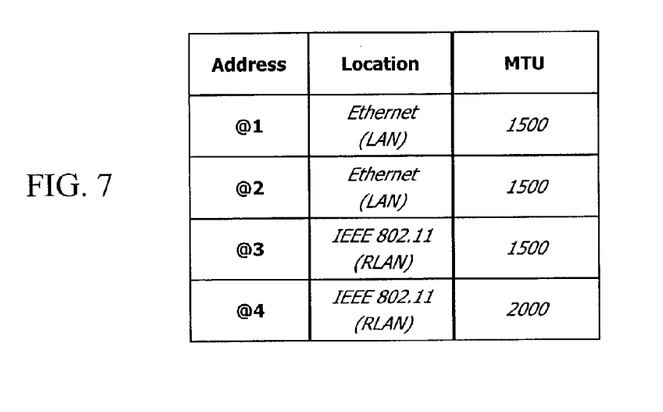
FIG. 7 depicts an information base containing the maximum size of the information to be transmitted.

It is then possible to update an information base such as the one illustrated in FIG. 7. This information base will advantageously be situated in an interface allowing communication between the two local subnetworks, such as in the access point 5 illustrated in FIG. 1. There is found, in this information base, for each of the items of equipment or terminals in the network, its location with the maximum size of the MTU data information supported by the network for communicating with this node. In this information base, each item of equipment is referenced by its identifier, also referred to as the MAC address.

For each item of equipment, it is possible to add date information corresponding to the last date of updating its information, from which it is possible to implement a cyclic purge procedure for eliminating from the information base the information considered to be obsolete.

As a variant, it is possible to keep in the information base only the information relating to the items of equipment which have a maximum MTU size of the data information supported less than that of the equipment to which the present invention is applied.

Figure 8:
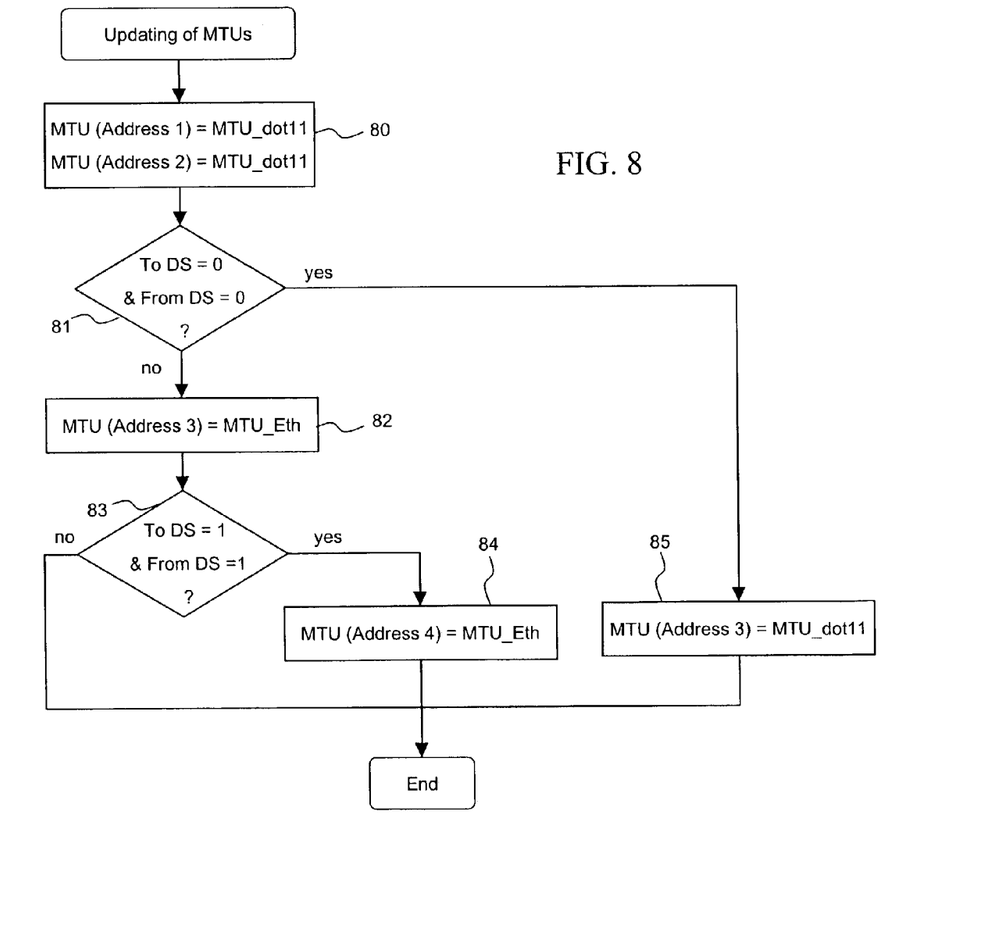
FIG. 8 is a flow diagram illustrating a process of updating the information contained in an information base such as the one in FIG. 7.

The flow diagram in FIG. 8 illustrates the procedure implemented for updating an information base of the type in FIG. 7.

This procedure is executed when an MAC frame is received. This processing is executed in addition to the processing steps, described by ANSI/IEEE 802.11, "Wireless LAN MAC and PHY specification", which are performed during such an event.

During a first step 80, the maximum size MTU of the data information supported by the equipment items whose identifiers are contained in the fields "Address 1" and "Address 2" are updated in the information base with the value MTU_dot11.

Next, during a test 81, the value of the bits "ToDS" and "FromDS" of the MAC frame are compared with the value 0. If these bits are equal to 0, a step 85 is passed to, during which there is updated, in the information base, the maximum size MTU of the data information supported by the equipment item whose identifier is contained in the field "Address 3", with the value MTU_dot11.

If the bits "ToDS" and "FromDS" do not both have the value 0, during a step 82, there is updated, in the information base, the maximum size MTU of the data information supported by the equipment whose identifier is contained in the field "Address 3", with the value MTU_Eth.

Then a test 83 is performed, during which the value of the bits "ToDS" and "FromDS" of the MAC frame are compared with the value 1. If these bits are equal to 1, a step 84 is passed to, during which there is updated, in the information base, the maximum size MTU of the data information supported by the equipment whose identifier is contained in the field "Address 4", with the value MTU_Eth.

If the bits "ToDS" and "FromDS" do not both have the value 1, just as following steps 84 and 85, the procedure ends.

In the above description, the parameter MTU_Eth corresponds to the value of the maximum size MTU of the data information supported by a network of the IEEE 802.3 or Ethernet type, and the parameter MTU_dot11 corresponds to the value of the maximum size MTU of the data information supported by a network of the IEEE802.11 type.

The variant mentioned above, consisting of keeping in the database only the information relating to the items of equipment which have a maximum size MTU of the data information supported less than that of the equipment item to which the present invention is applied, amounts to omitting steps 80 and 85.

In another variant, it is possible to choose to update the information base only following the reception of MAC frames intended for the equipment item to which the invention is applied.

Figure 9:
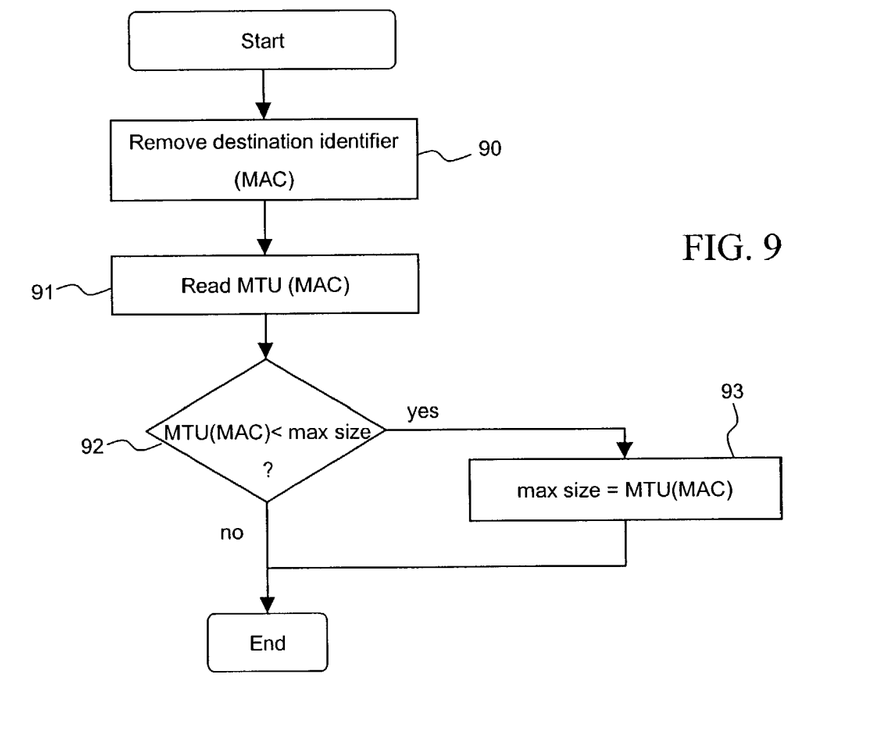
FIG. 9 is a flow diagram illustrating a method of adjusting the maximum size of the data packets acceptable to the network protocol in accordance with the present invention, in a particular embodiment.

The flow diagram in FIG. 9 illustrates a particular embodiment of the procedure used by the network protocol, in accordance with the present invention, for determining the maximum size of the data information (MTU) supported by this network.

This maximum size is then used by the network protocol in order to fragment the information to be transmitted.

This procedure starts during a step 90, during which the network address, the MAC address and the identifier of the destination (the MAC address) of the information to be transmitted are taken from a look-up table.

Then a step 91 is performed, consisting of reading in the information base of the interface including the method of access to the channel, the maximum size of the data information (MTU) supported by the destination identified by its MAC address.

Then, during a test 92, it is examined whether this value is less than the current maximum size allowed by the network protocol.

In the affirmative, during a step 93, this current maximum size is adjusted by allocating to it the value returned during the reading step 91.

In the negative, the procedure ends.

In a variant, this procedure can be used for initializing a discovery procedure based on the sending of test messages making it possible to discover a supported maximum size of the data information which is less than that determined by the invention. By way of example, for a network protocol of the TCP/IP type, a discovery protocol based on the sending of ICMP (Internet Control Message Protocol) messages as described in document U.S. Pat. No. 5,931,961 can initiate such tests with a maximum size as given by the invention.

Figure 10:
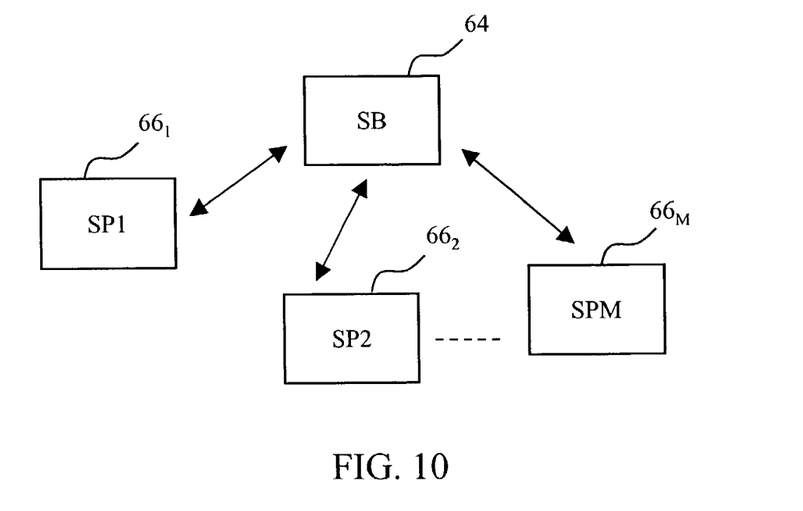
FIG. 10 depicts, in a simplified schematic form, a telecommunications network in accordance with the present invention, in a particular embodiment.

As shown in FIG. 10, a network according to the invention consists of at least one station known as a base station SB designated by the reference 64 connected to a distribution system of the Ethernet type, and of several peripheral stations known as mobile terminals SPi, i=1, . . . , M, where M is an integer greater than or equal to 1, respectively designated by the references $66_1$, $66_2$, . . . , $66_M$. The peripheral stations $66_1$, $66_2$, . . . , $66_M$ are remote from the base station SB, each connected by a radio link with the base station SB and able to move with respect to the latter.

The base station 64 can comprise means adapted to implement an adjustment method according to the invention. As a variant, the base station 64 can comprise an adjustment device in accordance with the invention. In a similar fashion, at least one of the mobile terminals $66_i$ can comprise means adapted to implement an adjustment method according to the invention or comprise an adjustment device according to the invention.

Figure 11:
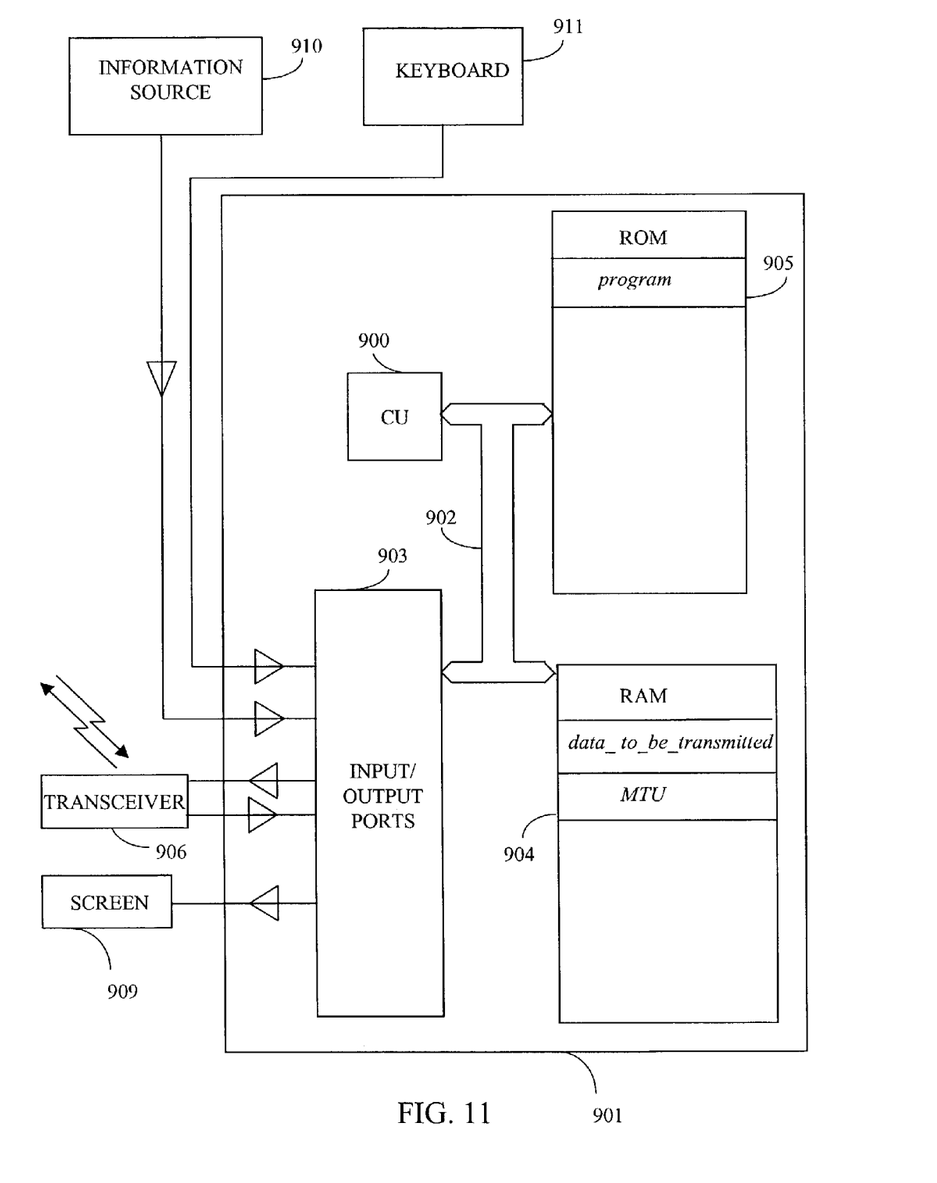
FIG. 11 illustrates schematically the constitution of a network station or computer transmission station comprising an adjustment device according to the present invention.

FIG. 11 illustrates schematically the constitution of a network station or computer transmission station comprising an adjustment device according to the present invention.

This station comprises a keyboard 911, a screen 909, an external information source 910 and a radio transceiver 906, conjointly connected to an input/output port 903 of a processing card 901.

The processing card 901 comprises, connected together by an address and data bus 902:
 a central processing unit 900;
 a random access memory RAM 904;
 a read only memory ROM 905; and
 the input/output port 903.

Each of the elements illustrated in FIG. 11 is well known to persons skilled in the art of microcomputers and transmission systems and, more generally, information processing systems. These common elements are therefore not described here. It should however be noted that:
 the information source 910 is, for example, an interface peripheral, a sensor, a demodulator, an external memory or other information processing system (not shown), and is preferably adapted to supply sequences of signals representing speech, service messages or multimedia data, in the form of sequences of binary data, and that
 the radio transceiver 906 is adapted to use a packet transmission protocol on a non-cabled channel, and to transmit these packets over such a channel.

It should also be noted that the word "register" used in the description designates, in each of the memories 904 and 905, both a memory area of low capacity (a few binary data) and a memory area of large capacity (making it possible to store an entire program).

The random access memory 904 stores data, variables and intermediate processing results in memory registers bearing, in the description, the same names as the data whose values they store. The random access memory 904 contains in particular:
 a register "data_to_be_transmitted", in which the digital signals to be transmitted are stored, and
 a register "MTU", in which the value of the maximum size of the data information is stored.

The read only memory 905 is adapted to store, in registers which, for convenience, have the same names as the data which they store:
 the operating program of the central processing unit 900, in a register "program".

The central processing unit 900 is adapted to implement an adjustment method as illustrated by the flow diagram in FIG. 9.

Although the particular embodiment described here applies to the standards in the families IEEE 802.11 and IEEE 802.3, the invention applies in a more general fashion to any other communication network comprising equipment for interconnection between two subnetworks of different types.

What is claimed is:

1. A device for optimizing information flow through a telecommunications network comprising a first subnetwork and a second subnetwork supporting different maximum sizes of data information units and a plurality of terminals transmitting data information units between said first subnetwork and said second subnetwork, said device comprising:
   means for constructing an information base, comprising:
      means for storing in said information base, for each terminal among said plurality of terminals, an identifier of said terminal and a maximum data information unit size allowed to communicate with said terminal;
      means for performing an analysis of any data information unit conveyed in one of said subnetworks, whatever the destination address of the data information unit is; and
      means for updating said information base, based at least in part upon said analysis; and
   means for adjusting a maximum data information unit size of data information units transmitted from a source terminal to a destination terminal having a destination terminal identifier, wherein said source terminal and said destination terminal are located in two different subnetworks, said updating means comprising:
      means for reading in said information base the maximum data information unit size allowed to communicate with said destination terminal identified by its identifier;
      means for comparing the read maximum data information unit size with a maximum data information unit size supported by the subnetwork in which said source terminal is located; and
      means for adjusting the maximum data information unit size of the data information units transmitted by said source terminal by allocating to it the read maximum data information unit size, when the read maximum data information unit size is less than the maximum data information unit size supported by the subnetwork in which said source terminal is located.

2. The device according to claim 1, wherein said updating means are adapted to update the information base using control information and addressing information accompanying the data information units.

3. The device according to claim 2, wherein said updating means are adapted to associate with each terminal among said plurality of terminals an item of date information corresponding to the date of the last updating of said information base for said terminal, said device also comprising purging means for periodically removing from said information base the information considered to be obsolete, according to the date information item.

4. The device according to claim 1, also comprising means for storing in said information base only the information relating to the terminals which have a maximum data information unit size less than that of said destination terminal.

5. The device according to claim 2, wherein said updating means are adapted to update said information base only following the reception of a data information unit intended for said destination terminal.

6. The device according to claim 1, wherein said information base is situated in the communication interface of a terminal allowing communication between said first and second subnetworks.

7. The device according to claim 1, wherein one of said first and second subnetworks is configured to operate in accordance with the IEEE 802.11 standard, the other subnetwork is configured to operate in accordance with the IEEE 802.3 standard and a data information unit is contained in a MAC frame.

8. A telecommunications network, comprising the device of claim 1.

9. A mobile station in a telecommunications network, comprising the device of claim 1.

10. A base station in a telecommunications network, comprising the device of claim 1.

11. A method for optimizing information flow through a telecommunications network comprising a first subnetwork and a second subnetwork supporting different maximum sizes of data information units and a plurality of terminals transmitting data information units between the first subnetwork and said second subnetwork, said method comprising:
    a first phase of constructing an information base, said first phase comprising the steps of:
       storing in the information base, for each terminal among the plurality of terminals, an identifier of the terminal and a maximum data information unit size allowed to communicate with the terminal;
       performing an analysis of any data information unit conveyed in one of the subnetworks, whatever the destination address of the data information unit is; and
       updating said information base, based at least in part upon said analysis; and
    a second phase of adjusting a maximum data information unit size of data information units transmitted from a source terminal to a destination terminal having a destination terminal identifier, wherein said source terminal and said destination terminal are located in two different subnetworks, said second phase comprising the steps of:
       reading in said information base the maximum data information unit size allowed to communicate with said destination terminal identified by said destination terminal identifier;
       comparing the read maximum data information unit size with a maximum data information unit size supported by the subnetwork in which the source terminal is located; and
       when the read maximum data information unit size is less than the maximum data information unit size supported by the subnetwork in which the source terminal is located, adjusting the maximum size of the data information units transmitted by the source terminal by allocating to it the read maximum data information unit size.

12. The method according to claim 11, wherein said analysis is based upon control information and addressing information accompanying the data information units.

13. The method according to claim 12, wherein the updating step further includes a purging step, carried out periodically, of eliminating from the information base the information considered to be obsolete, according to a date information item, wherein the date information item is associated with each terminal among the plurality of terminals and corresponds to a date of the last updating of the information base for said terminal.

14. The method according to claim 11, wherein only the information relating to the terminals which have a maximum data information unit size less than that of the destination terminal is stored in the information base.

15. The method according to claim 12, wherein said updating step is performed only following the reception of a data information unit intended for the destination terminal.

16. The method according to claim 11, wherein the information base is situated in the communication interface of a terminal allowing communication between the first and second subnetworks.

17. The method according to claim 11, wherein one of the first and second subnetworks is configured to operate in accordance with the IEEE 802.11 standard, the other subnetwork is configured to operate in accordance with the IEEE 802.3 standard and a data information unit is contained in a MAC frame.

18. The method according to claim 11, further comprising initializing a discovery procedure including sending at least one test message in the network in order to determine a maximum data information unit size which is less than the size adjusted by said adjustment method.

19. A telecommunications network, comprising means for implementing the method of claim 11.

20. A mobile station in a telecommunications network, comprising means for implementing the method of claim 11.

21. A base station in a telecommunications network, comprising means for implementing the method of claim 11.

* * * * *